United States Patent [19]
Reynolds

[11] Patent Number: 5,929,777
[45] Date of Patent: *Jul. 27, 1999

[54] RADIO ACTIVATED PERSONAL INFRARED DISTRESS BEACON

[75] Inventor: Kevin T. Reynolds, Plano, Tex.

[73] Assignee: MCI World Com, Inc., Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,416

[22] Filed: May 16, 1996

[51] Int. Cl.$^6$ ..................................... G01S 3/781
[52] U.S. Cl. ................... 340/825.49; 370/313; 455/100; 342/53; 250/339.14; 250/342; 340/825.45
[58] Field of Search ................... 340/825.44, 825.49, 340/539, 537, 825.45; 370/313; 379/56.3; 455/100; 342/53; 250/338.1, 339.14, 342; 359/350, 356, 850, 142; 1/1

[56] References Cited

U.S. PATENT DOCUMENTS

| | | |
|---|---|---|
| 3,806,936 | 4/1974 | Koster .................................. 455/100 X |
| 4,275,385 | 6/1981 | White .................................. 340/825.49 |
| 4,596,988 | 6/1986 | Wanka ........................... 340/825.49 X |
| 4,626,685 | 12/1986 | Pitalo et al. ......................... 250/342 X |
| 4,630,289 | 12/1986 | Wren .................................. 340/539 X |
| 4,709,412 | 11/1987 | Seymour et al. .................... 359/850 X |
| 4,763,361 | 8/1988 | Honeycutter et al. . |
| 4,803,487 | 2/1989 | Willard et al. . |
| 4,804,954 | 2/1989 | Mac . |
| 4,975,705 | 12/1990 | Gellekink et al. . |
| 5,001,488 | 3/1991 | Joguet . |
| 5,021,794 | 6/1991 | Lawrence ............................ 340/539 X |
| 5,115,224 | 5/1992 | Kostusiak et al. ............. 340/825.49 X |
| 5,130,713 | 7/1992 | Wagner . |
| 5,172,110 | 12/1992 | Tiefengraber ...................... 340/825.49 |
| 5,189,543 | 2/1993 | Lin et al. ................................ 359/142 |
| 5,299,277 | 3/1994 | Rose . |
| 5,363,425 | 11/1994 | Mufti et al. . |
| 5,396,243 | 3/1995 | Jalink, Jr. et al. . |
| 5,402,104 | 3/1995 | LaRosa . |
| 5,426,425 | 6/1995 | Conrad et al. . |
| 5,479,408 | 12/1995 | Will ............................... 340/825.44 X |
| 5,594,425 | 1/1997 | Ladner et al. ................. 340/825.44 X |
| 5,742,233 | 4/1998 | Hoffman et al. ............... 340/825.49 X |

FOREIGN PATENT DOCUMENTS 2 229 302  9/1990  United Kingdom .............. 340/825.49

Primary Examiner—Brian Zimmerman
Assistant Examiner—William H. Wilson, Jr.

[57] ABSTRACT

A personal infrared beacon unit capable of being worn as an adornment of clothing, incorporated into a part of a person's attire, or embodied within a personal pager, a cellular phone or a 2-way data device. The beacon unit may be in communication with an established network and may be activated externally by a locator signal, or internally by activation of an emergency button. Upon activation, the beacon unit emits coded timed infrared bursts in coherent beams, and when the beams are detected, they may be decoded visually or with a decoding device to provide the identity and location of the user.

21 Claims, 7 Drawing Sheets

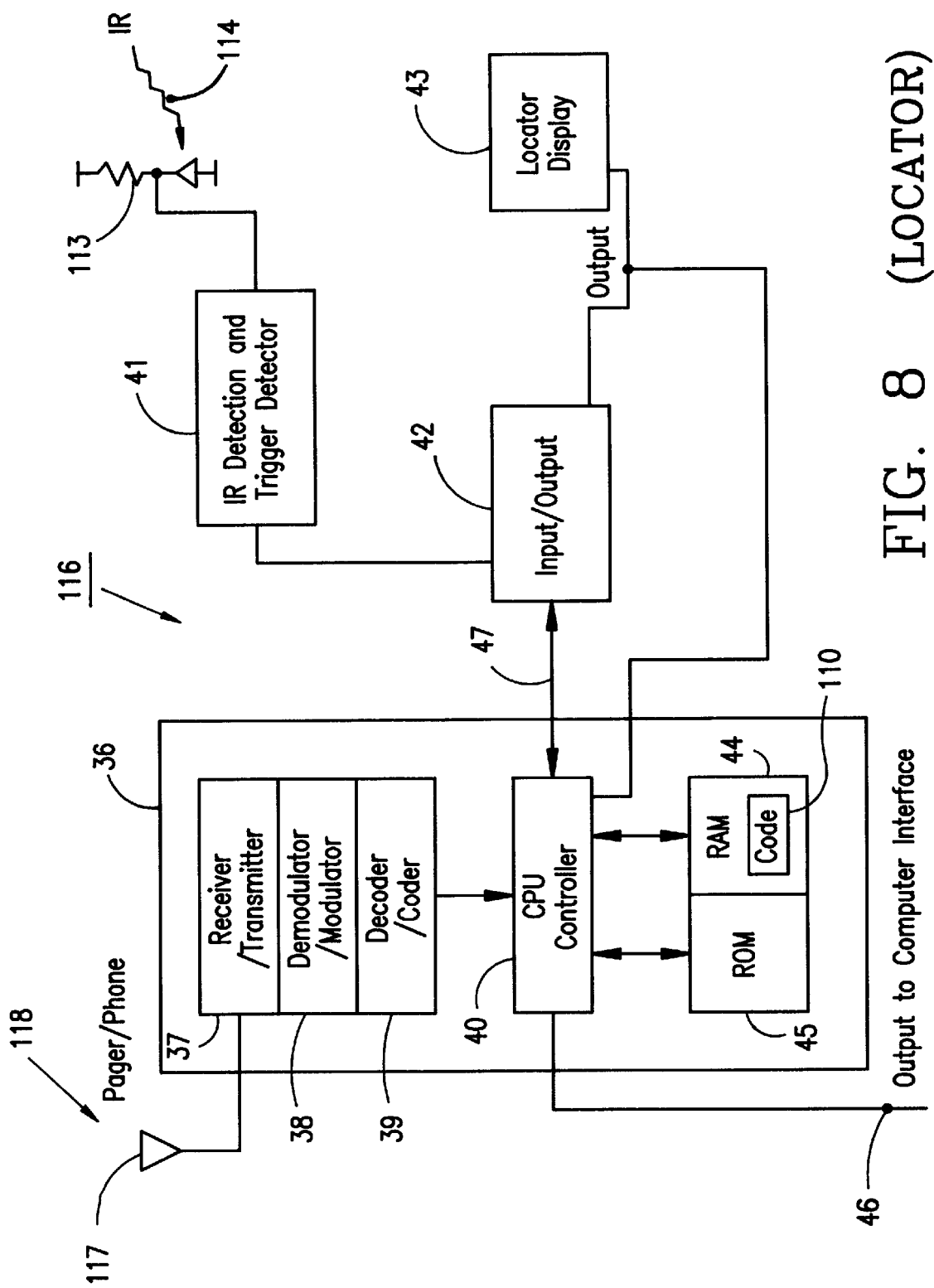
FIG. 8 (LOCATOR)

RADIO ACTIVATED PERSONAL INFRARED DISTRESS BEACON

FIELD OF THE INVENTION

This invention relates to personalized distress beacons, and more particularly to an apparatus and method for remotely actuating an infrared (IR) distress beacon to produce a coded infrared distress signal that is visible and decipherable only to those having compatible viewing and receiving equipment.

BACKGROUND OF THE INVENTION

When people find themselves in emergency conditions where immediate assistance is required, they may be out of touch or unable to get in touch with any assisting authority. Such emergency situations can arise both in military and civilian life and present a need for a personal identification beacon that can signal the proper authorities as to the location of the distressed person.

It is possible that the emergency situation may render the wearer of the beacon helpless or otherwise unable to activate his or her beacon. For example, such emergency situations may involve contact between the wearer of the beacon and hostile forces. Such conditions would require the beacon to signal for help in a way that is invisible to the hostile forces. For the beacon to be practical, it must be cost-efficient as well as small and portable.

In the past, mobile infrared (IR) units have been used to identify targets having one or more sources of infrared radiation. These IR units must operate independently of other radiation emissive sources, especially when used for targeting or surveillance purposes. In addition, such IR units must operate independently of a central network, as IR surveillance and identification is generally done by mobile independent field units. Examples of such prior art units are described in the patents mentioned below.

U.S. Pat. No. 5,396,243 describes an infrared laser battle-field identification beacon to be used in conjunction with forward looking infrared (FLIR) systems. A target vehicle's beacon system is triggered by a secure radio transmission from an approaching attack vehicle. The beacon uses an infrared source, which is a $CO_2$ laser that initiates two or more infrared pulses, which the attacking vehicle would then detect.

U.S. Pat. No. 5,001,488 describes an identification friend or foe (IFF) method and system wherein an IFF interrogator, having its transmission antenna joined to an infrared camera, transmits a coded radar signal to a potential target vehicle. Friendly vehicles are equipped with an IFF receiver and an infrared laser response, which is then read by the interrogator. The transducer of the detecting vehicle is directional, such that its receiving lobe must be pointed towards each station to be interrogated.

U.S. Pat. No. 5,299,227 describes a beacon identification system which enables distinction between friend or foe. The invention consists of a beacon and a special purpose detector. The beacon continuously transmits pulse-coded infrared radiation, maintaining a covert signal through selection of the optical wavelength used by the beacon and through the use of a spread spectrum output signal. The beacon's signal would not be visible to those using existing night vision equipment because a specially designed detector must be used to detect the beacon's signal.

U.S. Pat. No. 4,763,361 describes a system and device for vehicle recognition or IFF use, wherein an unpolarized light source, such as an infrared laser or short wavelength radar, is used to interrogate a potential target. On a friendly vehicle, a wire grid polarizer is mounted to vary the polarization of the interrogation signal. A corner reflector, mounted to the back of the grid polarizer, utilizes the principle of optical enhancement to return an interrogation signal that has been collimated and diffraction limited. A wire grid polarization analyzer is mounted rotatively on the front of a detector to receive the signals reflected from the potential target.

U.S. Pat. No. 5,130,713 describes an IFF system that includes an interrogation device which cooperates with an answering device. The interrogation device operates in the high frequency (HF) or microwave range and has relatively broad radiation characteristic for transmitted HF interrogation pulses and for receiving HF answer signals. A pulse laser operating in the optical range is used as a position finding device and the answer signal is only triggered when the transmitted pulse of the laser transmitter arrives during an HF interrogation pulse produced by the interrogation transmitter.

U.S. Pat. No. 4,975,705 describes a target detector provided with transmitter means for simultaneously generating laser and radar waves. The target detector is also provided with receiving means for obtaining target signals comprising target information received by reflected laser and/or radar waves, and also by passive infrared emissions.

The disadvantages of such prior art mobile IR units include the units' unavailability as a distress beacon for an individual. For example, such IR units have considerable power demands, as well as large housing requirements, that would make the unit cumbersome to use and transport by an individual user. In addition, because of their complexity, these IR units require specialized knowledge for their operation, thereby precluding their availability to the general population. Furthermore, such prior IR units are costly and are not on a centralized network system of the type available to an assisting authority, such as the local police.

SUMMARY OF THE INVENTION

It is therefore an object of the present invention to provide a method and apparatus for a personalized infrared distress beacon that is highly mobile, easy to use and inexpensive.

Another object of the invention is to provide a method for external triggering of a personalized infrared beacon to provide a coded message detectable only by a select group of rescuers.

A further object of the invention is to provide a personalized beacon that avoids alerting hostile persons as to the location of the beacon as the source of a transmitted message.

The present invention provides these and other features in a personal and small sized infrared beacon, which may be in communication with a particular network. The beacon may be activated by an external signal or a user induced signal to produce a code-pulsed collimated infrared red beam that can be detected, recognized and translated visually by a wearer of IR goggles or binoculars or electronically with a decoding device.

BRIEF DESCRIPTION OF THE DRAWINGS

A more complete understanding of the construction, operation and advantages of the present invention can be obtained by considering the following detailed description in conjunction with the accompanying drawings, in which.

DETAILED DESCRIPTION OF THE PREFERRED EMBODIMENTS

Figure 1:
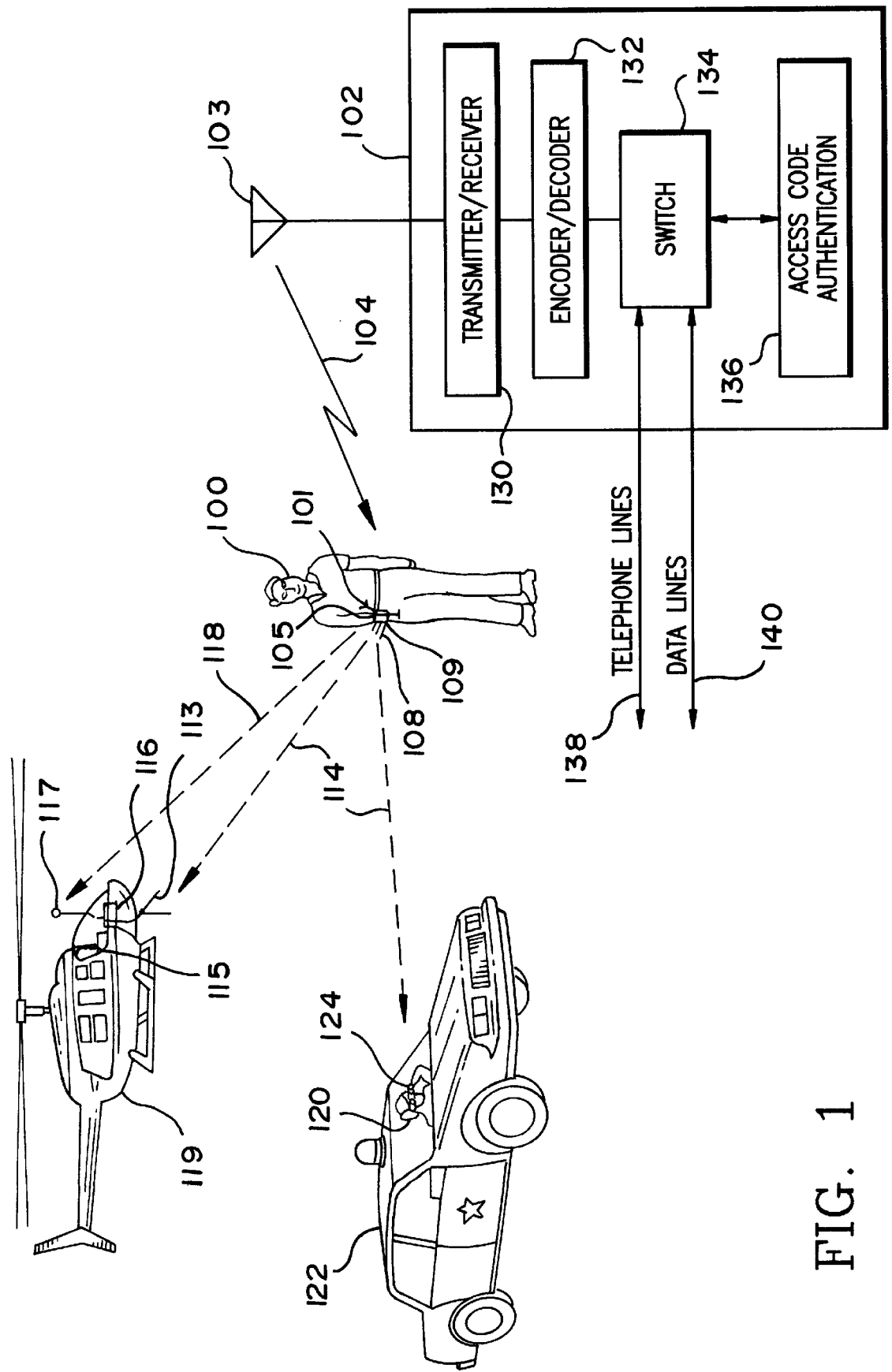
FIG. 1 illustrates the use of a personal message receiving and emergency signaling apparatus in accordance with the present invention.

The following detailed description of preferred embodiments is applicable to numerous personal infrared distress beacons as contemplated by the present invention. In FIG. 1, a user 100 is wearing a personal message receiving and emergency signaling apparatus (PMRESA) 101 according to the invention. Although the PMRESA 101 of FIG. 1 is depicted as a personal pager or cellular telephone, the PMRESA can take many different forms as will be discussed below.

A central base control (CBC) 102 emits an activating locator signal 104 via an antenna 103. CBC 102 represents a base station in a land line intelligent network, and comprises a transceiver 130, a codec 132, an intelligent switch 134, and an access code authentication component 136. CBC 102 is interconnected with the remainder of the intelligent network by land lines, preferably multiple telephone (voice) lines 138 and multiple data lines 140.

The locator signal 104 is received by the PMRESA 101, which then activates an optional display unit 105 for alerting the user of an incoming locator signal 104. The locator signal 104 also activates an emergency infrared beacon 108. The PMRESA may also be equipped with an optional hot or emergency key 109, that can be activated by the user 100 in the event of an emergency. Key 109 thus activates the emergency infrared beacon 108 without requiring an external locator signal.

An infrared signal 114 from beacon 108 is detected by an agent 115 of a searching authority via the antenna 113 of an electronic locator device 116 carried in a helicopter 119. The agent 115 decodes the received signal 114 with the aid of the locator device 116, which is described further below. Alternatively, an agent 120 in an automobile 122, such as a police cruiser, may use manually held IR binoculars 124 to visually detect and decode the infrared signal 114. Although the locator device is depicted as being carried in a manned helicopter or automobile, the step of detecting and determining the location of the PMRESA signal may be accomplished by a locator device carried in any manned or unmanned mobile detection vehicle, such as would be known by those skilled in the art of search and rescue.

Figure 2:
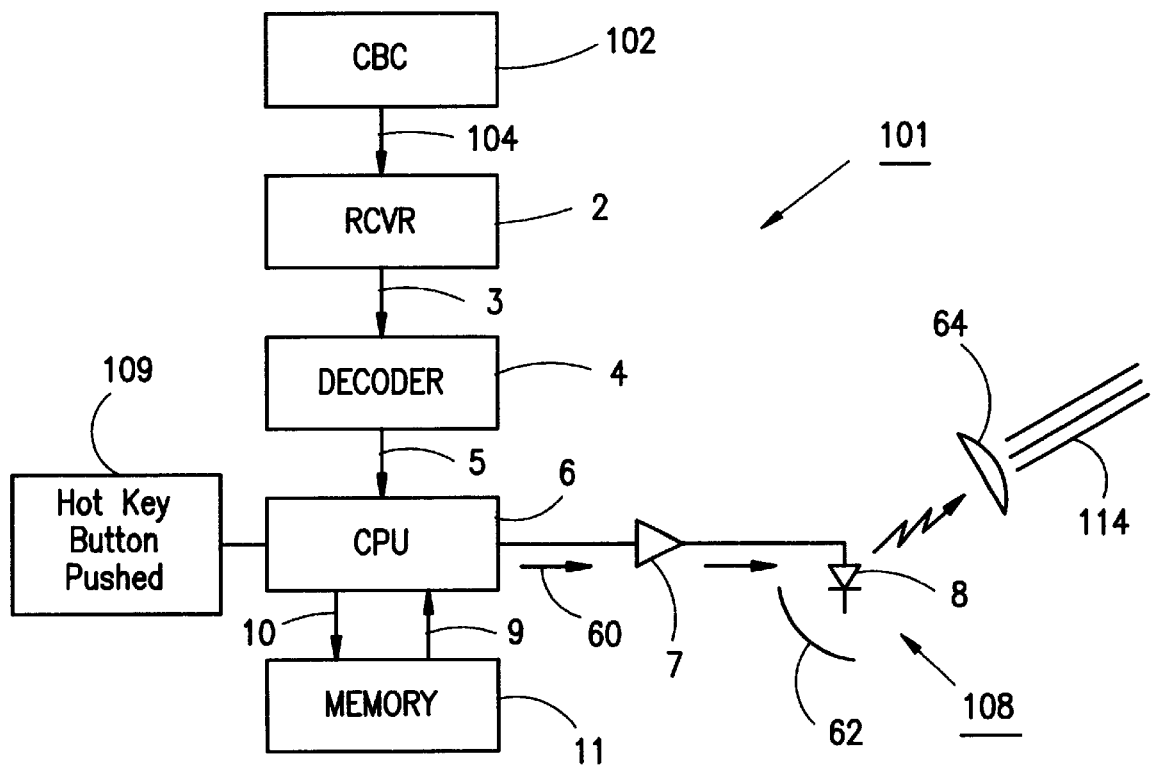
FIG. 2 is a flow-chart of a method by which a message is sent to and processed by the apparatus of FIG. 1.

FIG. 2 is a flow-chart illustrating operation of the PMRESA 101 upon receipt of a locator signal 104 from CBC 102. Incoming locator signal 104 is received by a receiver 2 housed within pager or phone unit 101. Unit 101 may also be a writing pencil or pen, a piece of jewelry, a watch, or some other personal and portable object with a housing of sufficient size to house the components of FIG. 2.

The receiver 2 transmits a first signal 3, which is representative of the incoming signal 104, to a decoder 4. Decoder 4 converts first signal 3 into a second signal 5, which is in a form readable by a central processing unit (CPU) 6. The CPU then compares the signal 5 with data stored in memory 11 to determine that the incoming signal 104 is an actual locator signal sent by CBC 102 and specifically addressed to unit 101, which may be one of many such devices activatable by CBC 102. The exchange between CPU 6 and memory 11 are shown by arrows 9 and 10.

Once the incoming signal has been authenticated, start and stop symbols are added to second signal 5 by the CPU to produce an activation signal 60, which is sent to a driver 7 that then activates an array of infrared emitters 8 in beacon 108, causing beacon 108 to emit infrared (IR) pulses 114 for specified durations. The durations of the IR pulses 114 may correspond to a code wherein particular time lengths of the IR pulses correspond to particular letters of the alphabet or other indicia, such as Morse Code. The beamed code may be identical to a message embedded in the signal 104 received from the CBC 102, or it may be a derived code obtained from a look-up table stored in memory 11, or it may be a stored identity code.

Although emitters 8 are shown as LED's in FIG. 2, they may instead be IR lasers or other sources of IR radiation. Where emitters 8 are LED's, the IR beacon may also comprise an additional rear reflecting piece 62 located behind the infrared emitters 8 to redirect all rearward directed infrared radiation in the forward direction. In addition, the IR beacon 108 may further comprise one or more lenses 64 for collimating emitted infrared radiation in the forward direction. These additional components provide for the efficient use of LED's or lasers to produce an intense, narrow beam of pulsed infrared radiation that can be viewed for a substantial distance, such as from the air.

Figure 3:
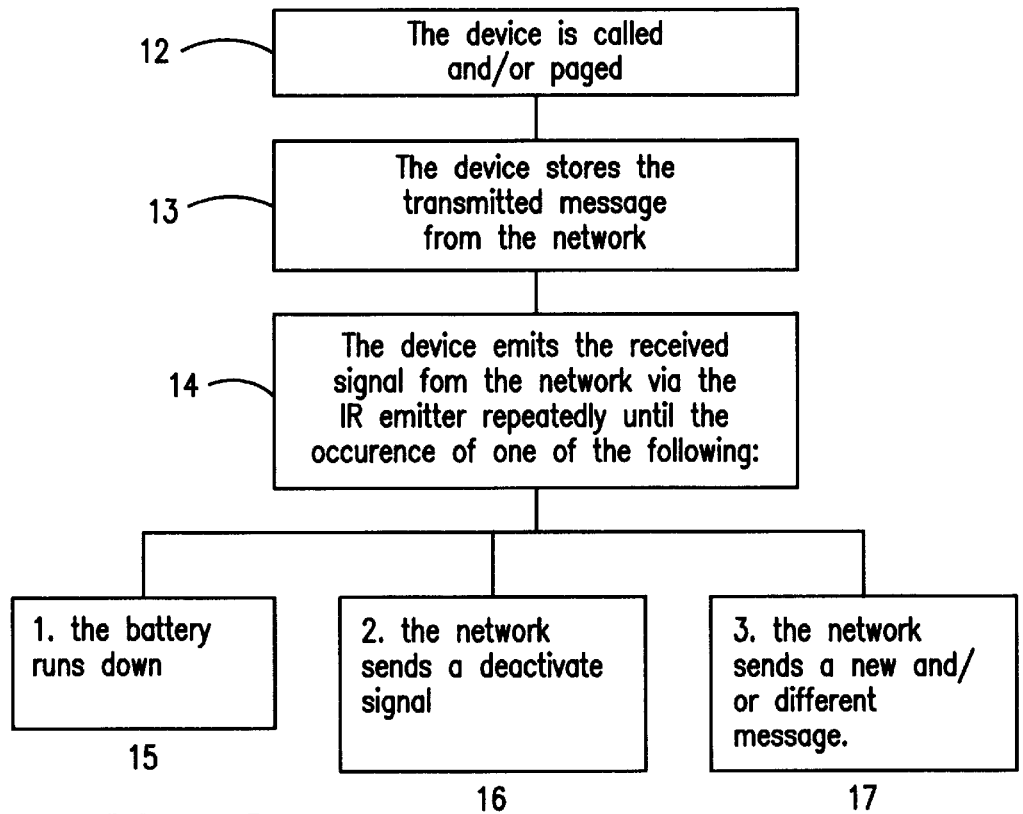
FIG. 3 is a flow-chart of a method of operating the apparatus of FIG. 1.

FIG. 3 depicts a flow-chart illustrating one method of operating the PMRESA 101 upon its activation by the CBC 102. Initially, the PMRESA is signaled and receives the signal at 12. The PMRESA stores the transmitted message at 13, and then at 14 retransmits the message by emitting IR pulses after verifying the authenticity of the initial signal. The IR emissions will cease upon the occurrence of one of the following: the battery of the PMRESA runs down as at 15, the CBC 102 sends a verified deactivation signal as at 16, or the CBC 102 sends a new and different message as at 17. Upon the latter occurrence, the new message will be retransmitted after verification and storage.

Figure 4:
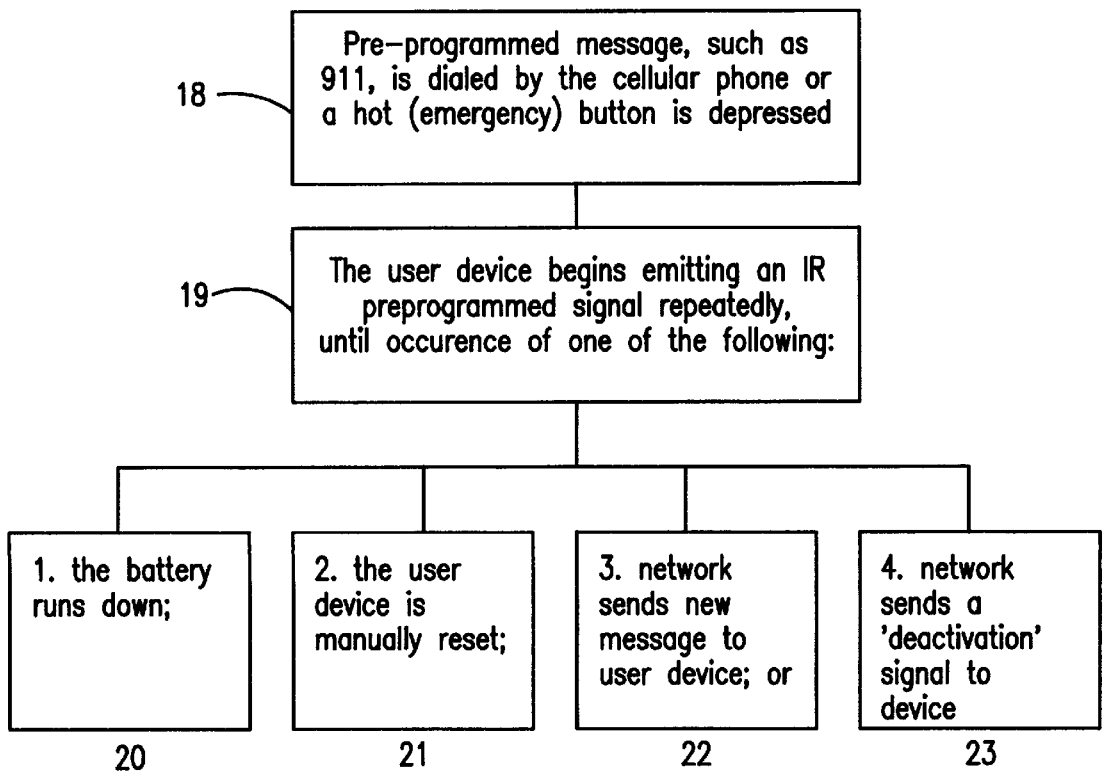
FIG. 4 is a flow-chart of another method of operating the apparatus of FIG. 1.

FIG. 4 depicts a flow-chart illustrating another method of operating the PMRESA 101 upon its activation by the CBC 102. In this embodiment, the PMRESA (pager, cellular phone, watch, jewelry, or the like) has one or more preprogrammed messages stored in memory 11, and when called or paged or when the hot key (emergency button) 109 is depressed as at 18, the preprogrammed message is transmitted as an IR signal as at 19. If more than one preprogrammed message is stored in memory 11, this message may be changed by receipt of a new signal 104, or by depressing the hot key one or more additional times. The preprogrammed IR signal is repeated until the occurrence of one of the following events: the battery runs down as at 20, the PMRESA is manually reset by the user as at 21 by using the hot key or a separate reset button, the CBC sends a new signal to the PMRESA thereby activating a different message as at 22, or the network sends a verified deactivation signal to the PMRESA as at 23.

The aforementioned system involves components that can be made on a miniature scale, thereby allowing for the placement of the entire system within a housing the size of a quarter or smaller. This small housing can take the form of jewelry, watches or other adornments worn on the body. Likewise, the small sized components can be easily incorporated into a military uniform or hidden on a vehicle. These components can also be housed in existing portable communication devices, including small pagers and cellular telephones as described in more detail below and shown in FIGS. 5 and 6.

Figure 5:
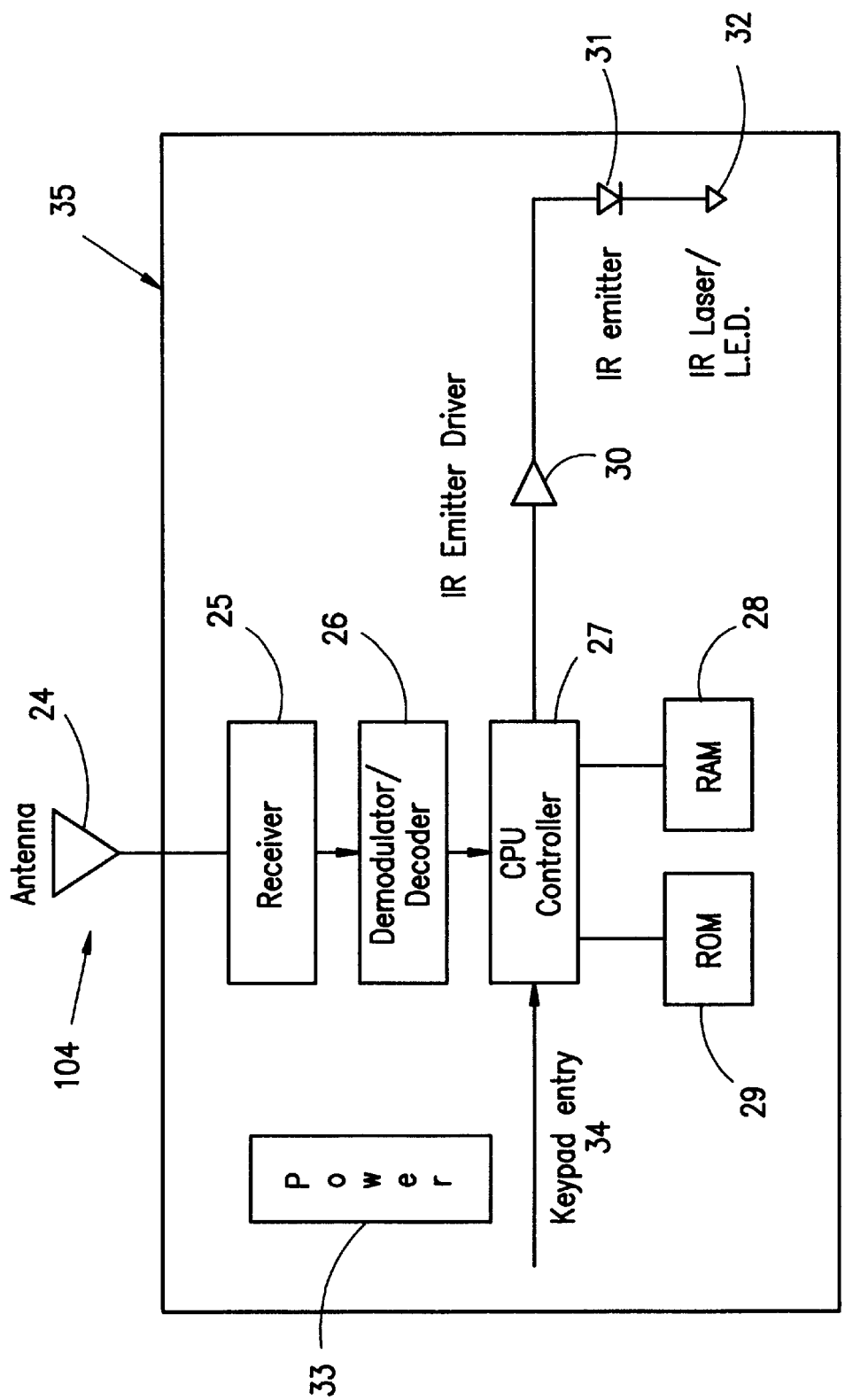
FIG. 5 is a schematic diagram of the apparatus of FIG. 1 wherein the apparatus comprises a personal pager or its equivalent.

FIG. 5 depicts a schematic diagram of the internal components of a PMRESA 101 as embodied in a pager 35. A locator signal 104 is received by an antenna 24 and passed to a receiver 25, after which it is demodulated and decoded within a decoder 26. A CPU controller 27 then verifies the authenticity of the signal through comparisons made with the use of a ROM 29 and a RAM 28. Upon verification and the addition of start and stop symbols within CPU 27, an IR emitter driver 30 is activated for causing an IR emitter 31 and an IR laser or an LED array 32 to emit a distress signal of coded pulses in response to the authenticated locator signal. The pager 35 is powered by a portable power supply 33, such as a battery. In addition to activation by signal 104 from CBC 102 via antenna 24, the pager can also be activated through a key pad entry 34 sent directly into the CPU 27.

Figure 6:
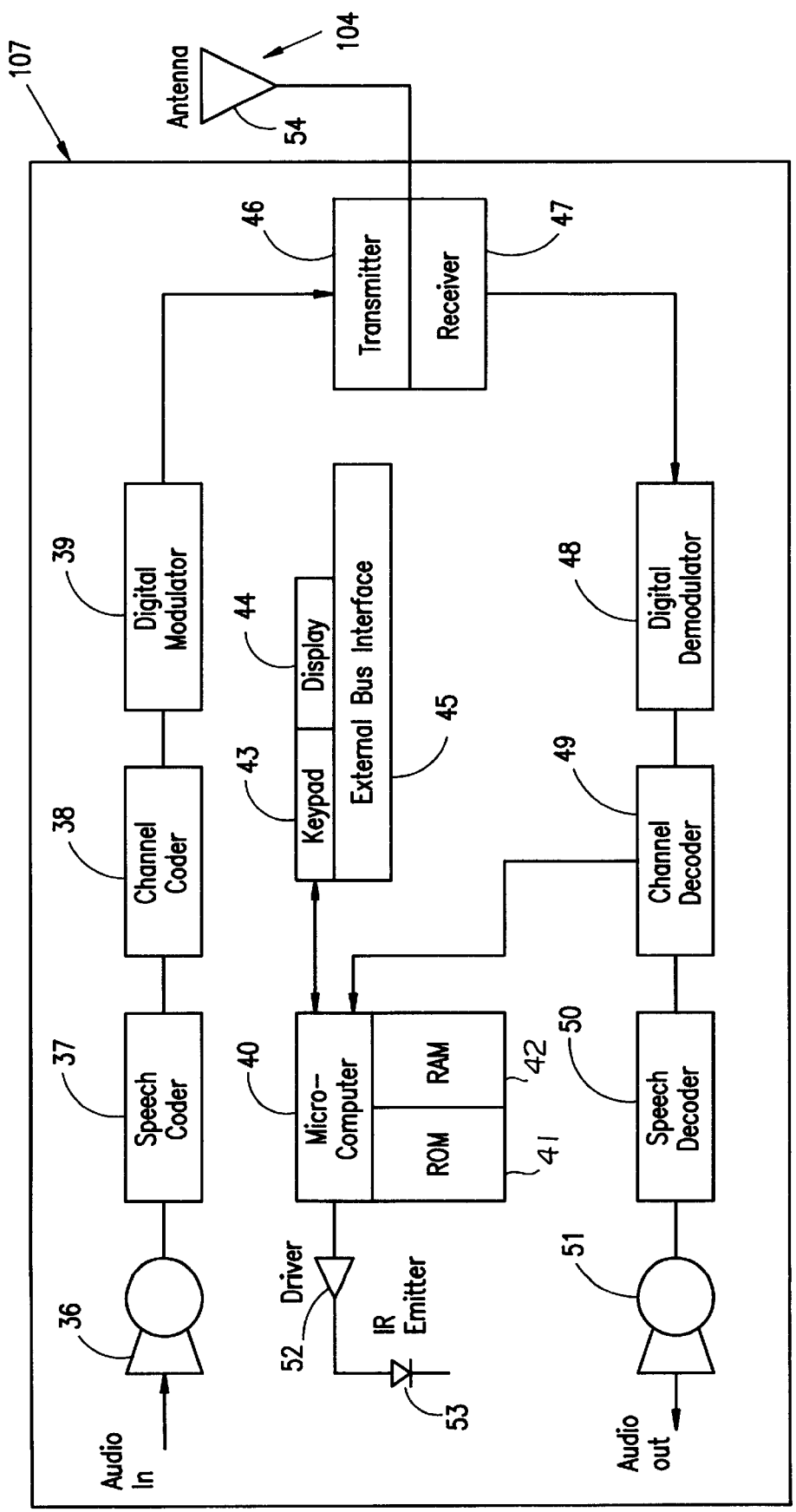
FIG. 6 is a schematic diagram of the apparatus of FIG. 1 wherein the apparatus comprises a cellular telephone or its equivalent.

FIG. 6 depicts a schematic diagram of the internal components of a PMRESA 101 as embodied in a cellular telephone 107. The locator signal 104 is received through an antenna 54 and a transceiver having a transmitter section 46 and a receiver section 47. The signal is demodulated by digital demodulator 48 and decoded by channel decoder 49. The locator signal is then sent to microcomputer 40, where it is verified using internal ROM 41 and RAM 42. Upon signal verification, a distress signal, either embedded within the locator signal or preprogrammed, is emitted by a driver 52 to activate an IR emitter 53. The user can deactivate the distress signal through an entry via a keypad 43. The keypad 43 and a visual display 44 are in electrical connection with an external bus interface 45. Conventional internal components of the cellular phone 107 include an audio receiving microphone 36 in electrical connection with a speech coder 37, a channel coder 38 and a digital modulator 39. In addition, a conventional cellular phone includes a speech decoder 50 and a speaker 51 for producing audible sounds.

Figure 7:
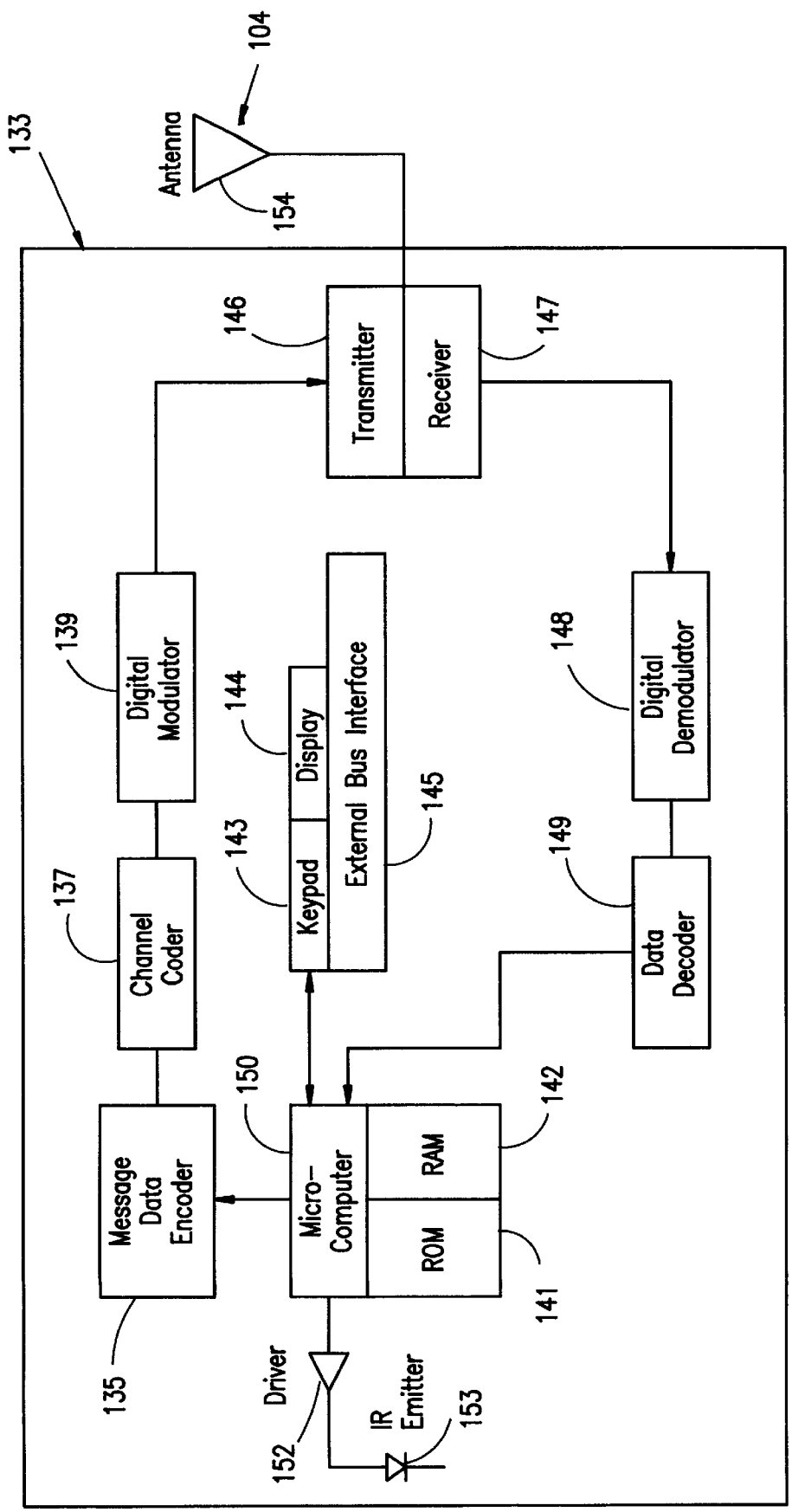
FIG. 7 is a schematic diagram of the apparatus of FIG. 1 wherein the apparatus comprises a 2-way data device; and, FIG. 8 is a schematic diagram of the receiving unit of FIG. 1 that can be used with the apparatus of FIGS. 5, 6 or 7.

FIG. 7 depicts a schematic diagram of the internal components of a PMRESA 101 as embodied in a 2-way data device of the type that has recently emerged in the telecommunications market. The locator signal 104 is received through an antenna 154 and a transceiver having a transmitter section 146 and a receiver section 147. The signal is demodulated by digital demodulator 148 and decoded by a data decoder 149. The locator signal is then sent to microcomputer 150, where it is verified using internal ROM 141 and RAM 142. Upon signal verification, a distress signal, either embedded within the locator signal or preprogrammed, is emitted by a driver 152 to activate an IR emitter 153. The user can deactivate the distress signal through an entry via a keypad 143. The keypad 143 and a visual display 144 are in electrical connection with an external bus interface 145. The keypad 143 also may be used to generate a personalized return message or a preprogrammed return message via microcomputer 150, a message data encoder 135, a channel coder 137, a digital modulator 139 and transmitter section 146.

The capabilities of network intelligence are especially useful with the 2-way data device of FIG. 7. A distress command is sent to the 2-way device 133. Upon acknowledgement of the receipt of this command, together with an accompanying return transmission of specific message data back to CBC 102, the network decodes the message data for cell level information, which is then used in conjunction with visual location efforts within that cell area. The return message may also be used by the network intelligence to trigger an emergency response by government authorities, similar to the response produced by dialing 911.

Receipt of a coded IR transmission by a searcher and/or rescuer requires a decoder. Because the pulses are in the infrared range, the pulses are invisible to the naked eye and require special night time IR goggles or binoculars. In addition, because the pulses are of relatively short duration and coded, interpretation of the transmitted IR message may be difficult without a decoder device.

A decoder device in the form of the locator 116 shown in FIG. 8 can comprise any IR receiver sensitive to the frequency and pulse train of the IR emission. FIG. 8 is a schematic diagram of an electronic circuit suitable for use within the locator 116. An infrared signal 114 is detected by the antenna 113 of an IR Detection and Trigger Detector 41. The detected signal is inputted into a CPU controller 40 via an input/output bus 42. CPU controller 40, with the aid of a ROM 45, compares the received infrared signal with a code 110 stored in a RAM 44. At the same time, the locator is in radio frequency (RF) communication 118 with CBC 102 (FIG. 1). The RF communication 118 is maintained through an antenna 117.

The RF communication 118 is received via a transceiver 37, modulated and demodulated via demodulator/modulator 38 and coded and decoded via decoder/coder 39. The RF information is then sent to CPU controller 40 where it is compared with the IR information to confirm (or deny) the agreement between the messages contained therein, and thereby identify the user 100 as the person needing rescue or other assistance. An output 47 of CPU 40 is then directed, via input/output bus 42, to a locator display 43 for informing the searcher 115 of the identity of the user 100. CPU 40 may also be interfaced with additional hardware via line 46 to a computer interface.

The locating device 116 is thus used by the searcher/rescuer to determine the location of the emergency beacon though detection and decoding of the beacon's infrared pulses. The beacon infrared code can, for example, be the universally recognized Morse Code. The time of the IR pulse is then geared to equal a 'dot' by a short timed burst, and a 'dash' by a longer timed burst. Of course, specialized codes may also be used to further avoid unauthorized interception of the pulsed IR message.

The personal pager and cellular phone embodiments, which may be used in communication with an existing communications network, will provide rapid access to general use of the infrared beacon of the invention. While this invention has been described in conjunction with these specific embodiments thereof, it is evident that many alternatives, modifications and variations will become apparent to those skilled in the art when they learn of these embodiments. Accordingly, the preferred embodiments of the invention as set forth herein are intended to be illustrative, and not limiting. Various changes may be made without departing from the spirit and scope of the invention as defined by the claims set forth below.

What is claimed is:

1. An emergency message system for activating and detecting an emergency distress signal, said system comprising:

a radio receiver for receiving message information being transmitted on a radio frequency communications channel and containing a selective call address, a message storage device responsive to the selective call address for effecting the storing of the received message information, a signaling device for generating a coded infrared distress signal conveying a message corresponding to the received message information, and a locator device for locating and detecting said distress signal and decoding said message conveyed by said distress signal;

said radio receiver, said message storage device and said signaling device being housed in a first portable unit adapted to be carried by a person, and said locator device being housed in a second portable unit adapted to be carried in a mobile vehicle capable of transporting said locator device to varying locations from which said distress signal may be observed.

2. The emergency message system according to claim 1, wherein the distress signal originates by user activation of an activation element housed with the apparatus.

3. The emergency message system according to claim 1, wherein the distress signal originates by said radio message activating the beacon signaling device.

4. The emergency message system according to claim 1, wherein the beacon signaling device comprises a plurality of light emitting diodes.

5. The emergency message system according to claim 1, wherein said beacon signaling device comprises at least one light emitting diode.

6. The emergency message system according to claim 1, wherein said beacon signaling device comprises a laser emissive in the infrared radiation range.

7. The emergency message system according to claim 1, wherein said beacon signaling device comprises a reflecting surface located behind an infrared source and arranged to redirect all rearwardly directed infrared radiation in a forward direction coherent beam.

8. The emergency message system according to claim 1, wherein said beacon signaling device comprises an infrared source and at least one optical element for collimating infrared radiation emitted by said source in an outward direction.

9. The emergency message system according to claim 1, wherein said emitted messages comprise infrared radiation pulses of different timed durations such that a sequence of said timed durations constitutes a code.

10. The emergency message system according to claim 1, wherein said message storage device comprises a memory component for storing a plurality of messages.

11. The emergency message system according to claim 1 further comprising a base control device for transmitting said message information to said radio receiver, said base control device providing at least 1-way communication with an intelligent network.

12. The emergency message system according to claim 11 further comprising a radio transmitter for transmitting other message information to said base control device, and wherein said base control device provides 2-way communication with said intelligent network.

13. The emergency message system according to claim 12 wherein said radio transmitter is responsive to input from a microprocessor, and wherein said other message information is programmed into a memory device connected to said microprocessor.

14. The emergency message system according to claim 12, wherein said radio transmitter is responsive to input from a microprocessor, and wherein said other message information is provided by an input device activatable by a user to create said other message information.

15. The emergency message system according to claim 12, wherein said base control device is capable of communicating with governmental authorities for providing emergency services that might be needed by a user of said apparatus.

16. The personal message receiving system according to claim 1, wherein said first portable unit comprises a personal pager.

17. The personal message receiving system according to claim 1, wherein said first portable unit comprises a cellular telephone.

18. The personal message receiving system according to claim 1, wherein said first portable unit comprises a two-way data device.

19. A method of activating and detecting an emergency distress signal, said method comprising steps of:

receiving a locator signal at a radio receiver;

verifying the addressee of said locator signal;

storing the locator signal in a message storage device;

causing a portable signaling device to emit a distress signal comprising a coded infrared message in response to said locator signal and detecting said coded infrared message with a locator device adapted to decode said coded infrared message carried by a mobile vehicle capable of transporting said locator device to varying locations from which said distress signal may be observed;

said radio receiver, said message storage device and said signaling device being housed in a first portable unit adapted to be carried by a person, and said locator device being housed in a second portable unit adapted to be carried by the mobile vehicle.

20. The method according to claim 19, wherein the source of said locator signal is external to the portable infrared beacon and is activated by a person other than the user of the beacon.

21. The method according to claim 19, wherein the source of said locator signal is internal to the portable infrared beacon and said source is activated by the user.

* * * * *